(12) United States Patent
Doria

(10) Patent No.: US 11,595,548 B2
(45) Date of Patent: Feb. 28, 2023

(54) METHODS FOR USING TEST COLOR SHEETS FOR PRINTING DEVICE CALIBRATION

(71) Applicant: Kyocera Document Solutions Inc., Osaka (JP)

(72) Inventor: Steve A. Doria, Los Angeles, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/327,275

(22) Filed: May 21, 2021

(65) Prior Publication Data

US 2022/0377206 A1    Nov. 24, 2022

(51) Int. Cl.
*H04N 1/60* (2006.01)

(52) U.S. Cl.
CPC ......... *H04N 1/6041* (2013.01); *H04N 1/6044* (2013.01)

(58) Field of Classification Search
None
See application file for complete search history.

(56) References Cited

U.S. PATENT DOCUMENTS

| | | | |
|---|---|---|---|
| 7,055,925 B2 | 6/2006 | Subirada et al. | |
| 7,212,312 B2 | 5/2007 | Motamed | |
| 8,665,492 B2 * | 3/2014 | Toriyabe | H04N 1/4015 358/1.9 |
| 10,267,683 B2 * | 4/2019 | Tanimura | H04N 1/46 |
| 2009/0316234 A1 * | 12/2009 | Yamamoto | H04N 1/6033 358/505 |
| 2012/0086962 A1 * | 4/2012 | Klassen | H04N 1/6041 358/1.9 |
| 2012/0120428 A1 | 5/2012 | Henderson | |

* cited by examiner

*Primary Examiner* — Barbara D Reinier
(74) *Attorney, Agent, or Firm* — Millen, White, Zelano & Branigan, P.C.; William Nixon

(57) ABSTRACT

A test color sheet of color strips of color patches is used in calibration operations for a printing device. Control color patches are used to identify each color strip and the scanning direction of any measured data captured by a color measurement tool. The control color patches have a unique pattern for each row. The patterns are changed according to an updating process that associates each unique pattern with its respective color strip. Scanning operations may be done in any sequence or direction without having to update the data being captured. The control color patches include a specified control color that differs from the color patches used for calibration operations.

18 Claims, 8 Drawing Sheets

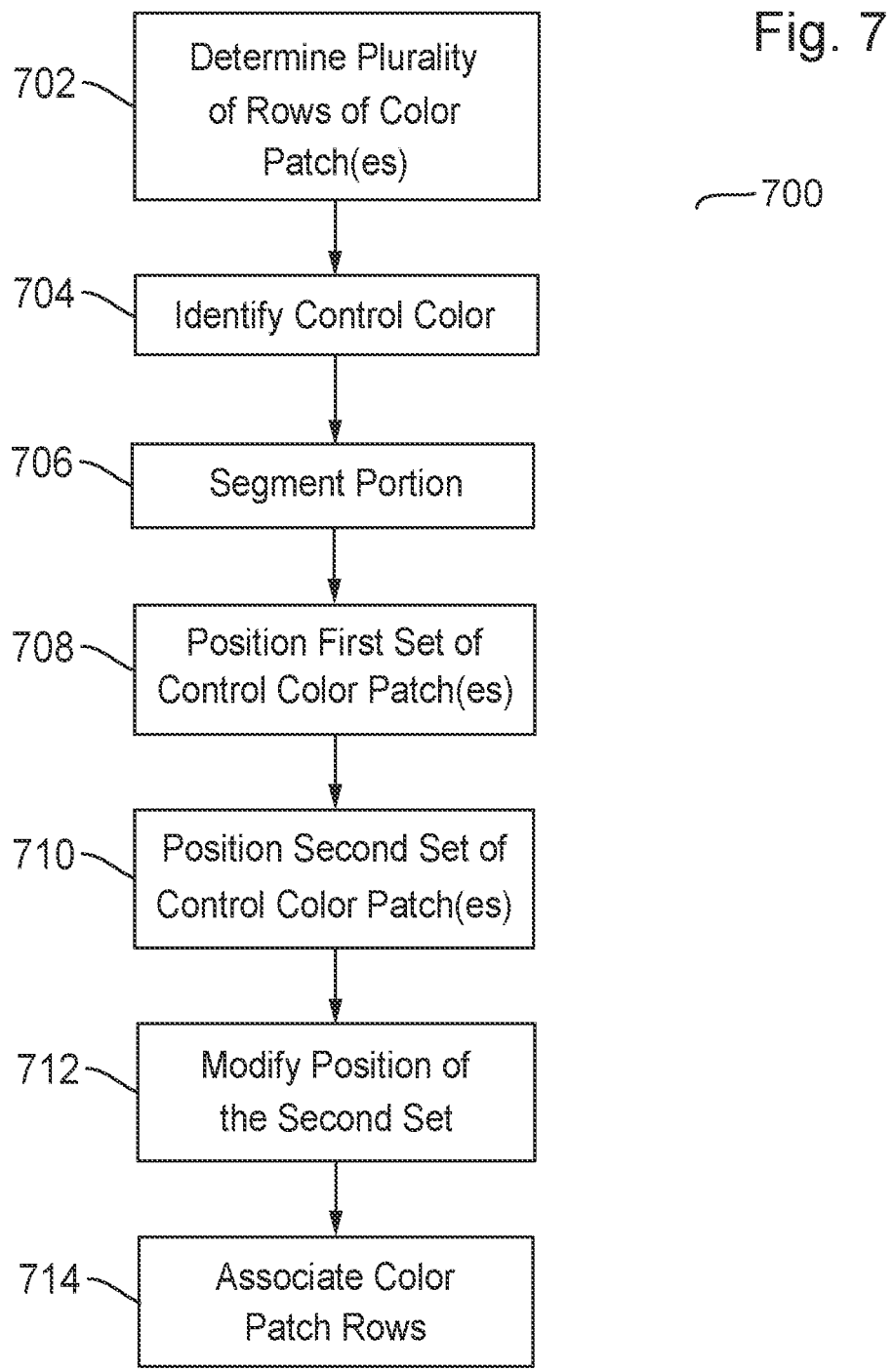

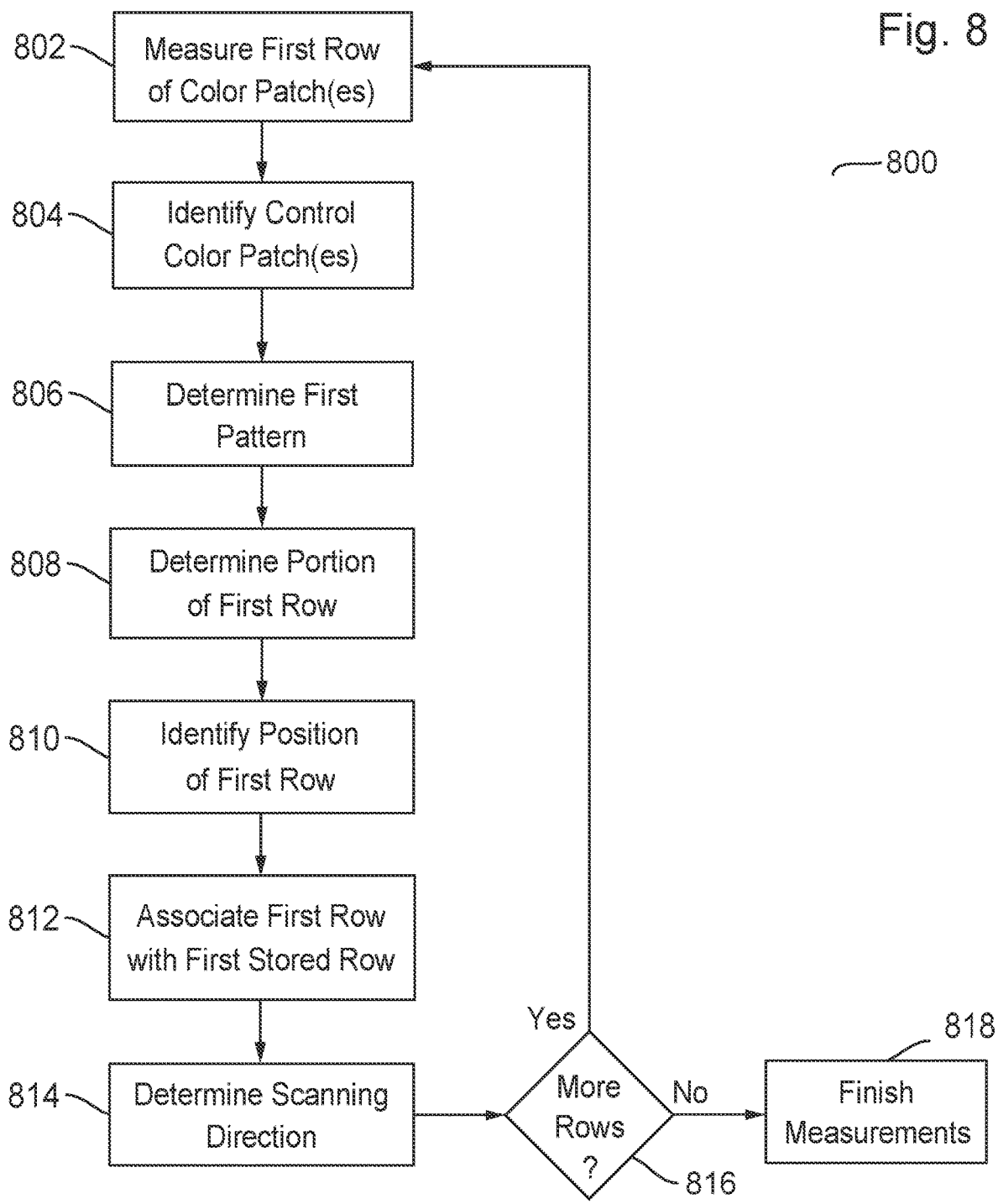

METHODS FOR USING TEST COLOR SHEETS FOR PRINTING DEVICE CALIBRATION

FIELD OF THE INVENTION

The present invention relates to generating test color sheets for use in printing device calibration having color patches. In particular, the present invention relates to positioning and measuring the color patches within the test color sheet.

DESCRIPTION OF THE RELATED ART

Color management is one of the more complex aspects of color printing. One operation used in color management is calibration of the printing device. Printing devices require calibration because color output may deviate from ideal colors over use, time, and conditions such as weather and characteristics of the paper or media used along with the colorants, or ink. Printing devices should reproduce color consistently throughout color printing operations. Calibration of a printing device involves measuring with a spectrophotometer the color patches on test color sheets output by the printing device.

Thus, test color sheets may be used for printing device calibration. Conventional software may default to measuring the next unmeasured color strip or prompt that the person operating the spectrophotometer identify which color strip is being scanned. The operator may inadvertently measure the wrong color strip or scan the color strip in the wrong direction. Further, the operator may need to stop measurement operations to restart or input information confirming the scanning process.

SUMMARY OF THE INVENTION

A method for positioning color patches within a test color sheet is disclosed. The method also includes determining a plurality of rows of color patches for the test color sheet. The method also includes identifying a control color for a plurality of control color patches. The control color does not match a color used in the color patches. The method also includes segmenting a portion of the plurality of rows on the test color sheet to include the plurality of control color patches. The method also includes positioning a first set of at least one control color patch according to a first pattern in the portion of the first row of color patches of the plurality of rows. The method also includes positioning a second set of at least one control color patch according to a second pattern in the portion of a second row of color patches of the plurality of rows. The second pattern differs from the first pattern. The method includes associating the first row of color patches with the first pattern for the first set of at least one control color patch and the second row of color patches with the second pattern for the second set of at least one control color patch.

A method for measuring color patches of a test color sheet is disclosed. The method includes measuring a first row of color patches and at least one control color patch. The method also includes identifying the at least one control color patch within the first row. A measured color for the at least one control color patch corresponds to a specified control color. The method also includes determining a first pattern for the at least one control color patch in the first row. The method also includes determining a portion of the first row where the first pattern is positioned. The method also includes determining a scanning direction for the first row based on the portion where the first pattern is positioned. The method also includes associating the first row with a first stored row of color patches according to the first pattern.

A method for capturing measurement data for calibration of a printing device is disclosed. The method includes configuring a test color sheet for the calibration. The test color sheet includes a plurality of rows having color patches and at least one control color patch. The method also includes selecting a unique pattern for the at least one control color patch for each row of the plurality of rows. The unique pattern is not used in another row of the plurality of rows. The method also includes positioning the unique pattern in a portion of each row. The portion is positioned on a left side or right side of the row. The method also includes measuring the plurality of rows having color patches and at least one control color patch. A measured color for the at least one control color patch corresponds to a specified control color. The method also includes determining the unique pattern for the at least one control color patch for each row of the plurality of rows. The method also includes determining the unique pattern is positioned in the portion for the row. The method also includes associating each row with a stored row of color patches according to its unique pattern. The method also includes determining a scanning direction for each row based on the portion where the unique pattern is positioned.

BRIEF DESCRIPTION OF THE DRAWINGS

Various other features and attendant advantages of the present invention will be more fully appreciated when considered in conjunction with the accompanying drawings.

FIG. 7 illustrates a flowchart for positioning control color patches and color patches within a test color sheet according to the disclosed embodiments.

FIG. 8 illustrates a flowchart for measuring control color patches and color patches of a test color sheet according to the disclosed embodiments.

DETAILED DESCRIPTION OF THE PREFERRED EMBODIMENTS

Figure 1:
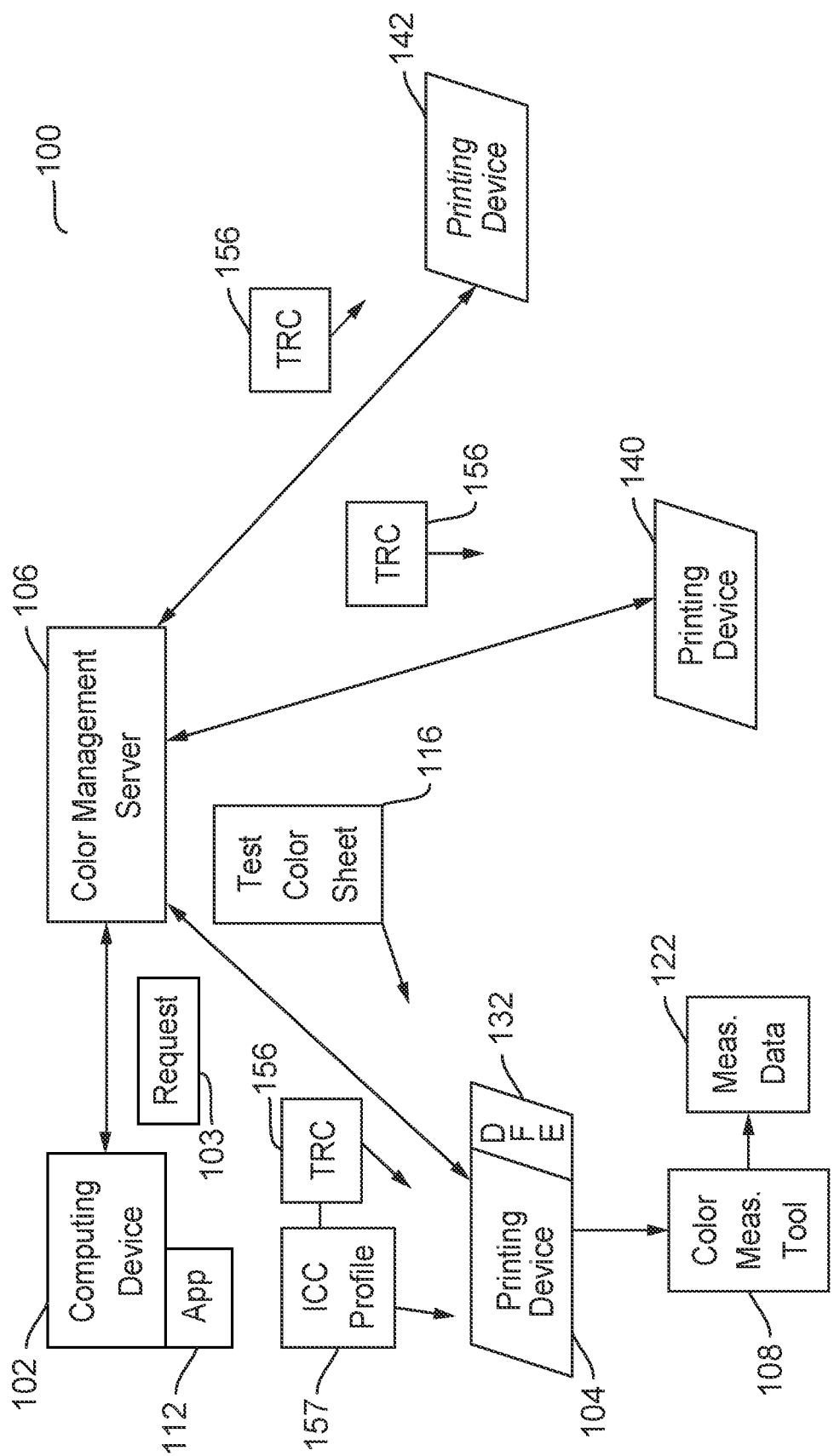
FIG. 1 illustrates a block diagram of a color management system for printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet. Control strip—a test color strip that also contains encoded information.

Test color sheet—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments avoid the ambiguity that occurs when attempting to identify color strips within a test color sheet in which more than one test color strip has similar differences between the measured and ideal values for the test color patches. The disclosed embodiments also address a potential problem when attempting to detect the scan direction by minimizing the error between the ideal and actual color patch measurements values. The disclosed embodiments identify the test color strip being measured and the direction that the test color strip is scanned for measurement.

The disclosed embodiments include the strategic positioning of a minimized number of control color patches on the test color sheet for identification of color strips and the determination of the direction that a color strip is scanned with the color measurement tool. A control color patch may be made of any color producible by the printing device being calibrated. Preferably, the establishment of a control color patch as a color patch without colorant being applied minimizes the colorant used for calibration operations. Measurements of the control color patches are used as well as other color patches for the calibration operations.

In performing the calibration operations, a reference measurement value of the control color patch is measured while scanning a test color sheet control strip. The color patches in a color strip may be reversed and color strips may be reordered to balance the distribution of control color patches within the test color sheet. This feature allows measurement of variation in the output of a particular color when it is printed on different parts of the test color sheet.

FIG. 1 depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, system 100 may be a system or network within a print shop having several or more printing devices.

Printing devices 104, 140, and 142 may receive print jobs from color management server 106. They also may receive calibration print jobs and quality checks from color management server 106. Test color sheet 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color management profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management server 106 receives calibration request 103 within system 100. Color management server 106 generates a test color sheet 116 to obtain measurement data for the paper at printing device 104. Test color sheet 116 includes color patches used to perform calibration operations. Test color sheet 116 may use colorant ramps for each colorant. Test color sheet 116 is forwarded to printing device 104, which prints it out on the indicated paper/media type. An operator takes test color sheet 116. The operator may use color measurement tool 108 to measure the color patches on test color sheet 116 to obtain measurement data 122. Alternatively, printing device 104 may include inline measurement tools that automatically measure the color patches within test color sheet 116.

The operator or printing device measures the data on test color sheet 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFE) 132. In some embodiments, a TRC 156 may be stored in multiple printing devices within system 100. Calibration TRCs 156 also may be associated with ICC profile 157 that is sent to printing device 104. ICC profile 157 may be built upon calibrated output such as measurement data 122. ICC profile creation is disclosed in greater detail below.

Figure 2:
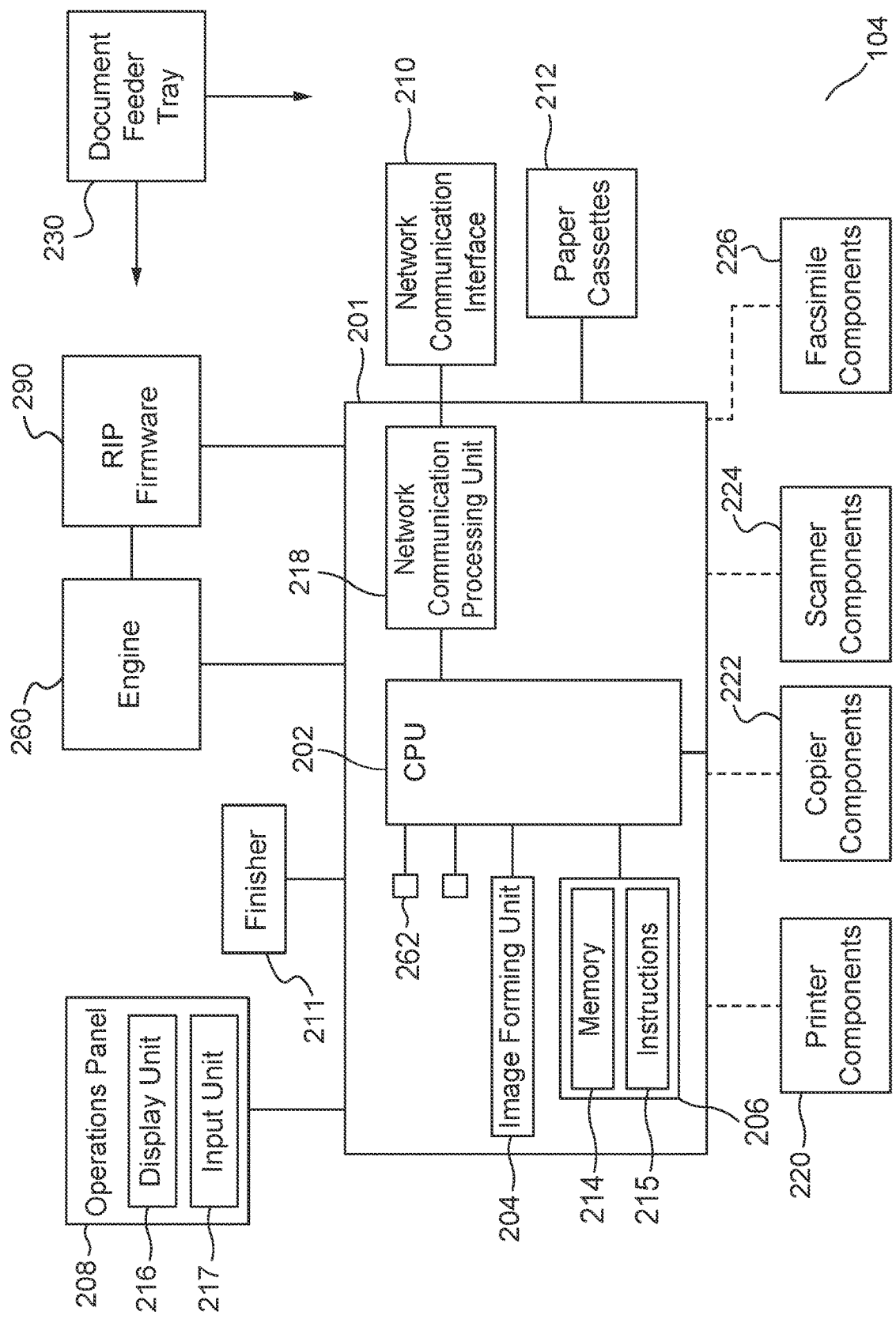
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with color management server 106 via network communication interface 210 by utilizing a network protocol. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

Figure 3:
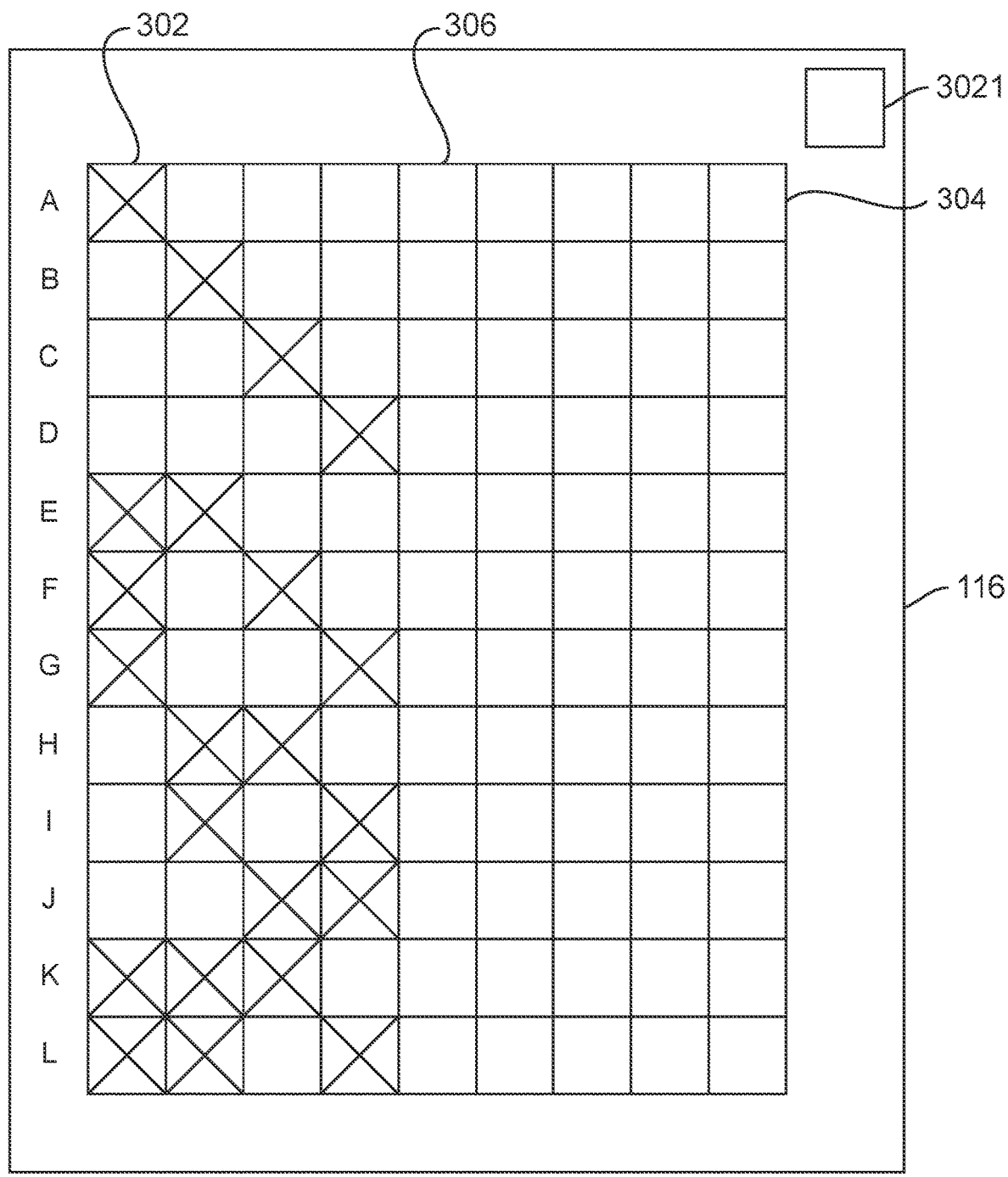
FIG. 3 illustrates a test color sheet according to the disclosed embodiments.

FIG. 3 depicts test color sheet 116 according to the disclosed embodiments. Test color sheet 116 includes control color patches 302 and color patches 304. Color patches 304 correspond to those patches to be measured for calibration operations after test color sheet 116 is printed at printing device 104. Color patches 304 may be various colors related to the primary colors of interest, with different increments of each color being printed. In contrast, control color patches 302 are a single color used to identify color control patches within test color sheet 116. Within FIG. 3, a control color patch may be shown by the "X" within the patch. A color patch may be shown the absence of any symbol, such as "X," within the patch.

As disclosed by FIG. 3, control color patches 302 are positioned within test color sheet 116 in a specified manner. These positions provide for color strip, or the rows of color patches, identification. Color strips A, B, C, D, E, F, G, H, I, J, K, and L are shown in FIG. 3. It should be noted that test color sheet 116 may not necessarily have such letters or designators printed thereon. Letters A to L are shown for illustrative purposes.

A number of color patches 304 is established as an arbitrary number. This number excludes the number of control color patches 302 to be used in test color sheet 116. The number of color patches 304, including the number of control color patches 302, per color strip is established as an arbitrary number. The number may be set by system 100, color management server 106, or printing device 104 depending on the calibration operation. Alternatively, the number of color patches and color patches per color strip may be set by the designer of test color sheet 116.

The color of control color patch 302 may be established by the operator or the person designing test color sheet 116. All control color patches 302 use this color. Color patches 304 that are not control color patches 302 shall not have the same color as the designated control color patches. Measurement values of the color for control color patches 302 should be different from the values of the various color patches 304. Preferably, the control color of control color patches 302 is white for white paper so as to not consume as much color ink.

Control color patches 302 are positioned in one of either the left or the right half of the color strips A-L of test color sheet 116. These positions exclude center-most color patch 306 in each color strip, or the center-most column of patches on test color sheet 116. This feature may only be present on test color sheets having an odd number of color patches 304 in the color strips. For example, test color sheet 116 in FIG. 3 has all control color patches 302 located on the left halves of color strips A-L. No control color patches are positioned to the right of center-most color patch 306. The term "the right-most allowed position" for a control color patch 302 is the position of the left patch from a color strip's center, or patch 306.

The position of control color patches 302 allow each color strip to have a unique pattern of control color patches that makes them identifiable during scanning operations. Color patches 304, which are not control color patches 302, are positioned in the color strips in locations that are not occupied by a control color patch.

Identification of control color patches 302 in color strips A-L is performed after each color strip is scanned and measured. This feature is accomplished by comparing the measured values of each color patch 304 in a color strip with the measured values of a reference control color patch 3021 included on test color sheet 116. Identification of each color strip and the scan direction is accomplished by examining the positions of each color patch 304 in the color strip with measured values that match the reference control patch measurement within some tolerance.

The disclosed embodiments minimizes the use of control color patches 302 within a test color sheet 116. Processing the measurements from scanning a color strip, such as color strip A, determines where control color patches 302 are positioned. As an example, the relative positions of control color patches 302 and color patches 304 may be represented by a string in which X is a control color patch and O is a color patch. The string OOOOOXOXO may be used in the example.

A convention may be adopted that specifies control color patches 302 are to be on the left side of test color sheet 116. Because control color patches 302 are found on the "right side" of the color strip in the string representation OOOOOXOXO, the disclosed embodiments determine that the scan direction is to be right-to-left. After normalizing OOOOOXOXO to OXOXOOOOO, the color strip being scanned can be identified in this example as color strip I in FIG. 3.

Thus, the patterns of control color patches 302 used in each color strip may be stored or saved within system 100 to identify the respective color strip according to its unique control color patch pattern. For example, color management server 106 may provide this information to printing device 104 along with test color sheet 116. When a color strip is scanned, the string of control color patches and color patches is compared to the stored reference patterns to determine the applicable color strip. The disclosed embodiments also can handle different scanning directions as noted above.

For example, the operator may scan a color strip to capture a string of XXOOOOOOO. The next string captured may be OOOOOOXOX. Using the stored reference patterns, the disclosed embodiments can determine that the scanned color strips are color strip E for the first string and color strip F for the next one. In another example, the next string captured may be OOOOOXOOX, which corresponds to color strip G. The disclosed embodiments may alert the operator that she potentially missed a color strip, in the example, color strip F in going from color strip E to color strip G. Further, after all color strips A-L are scanned, the disclosed embodiments may check to see if any scans of a color strip are incomplete and alert the operator.

Figure 4:
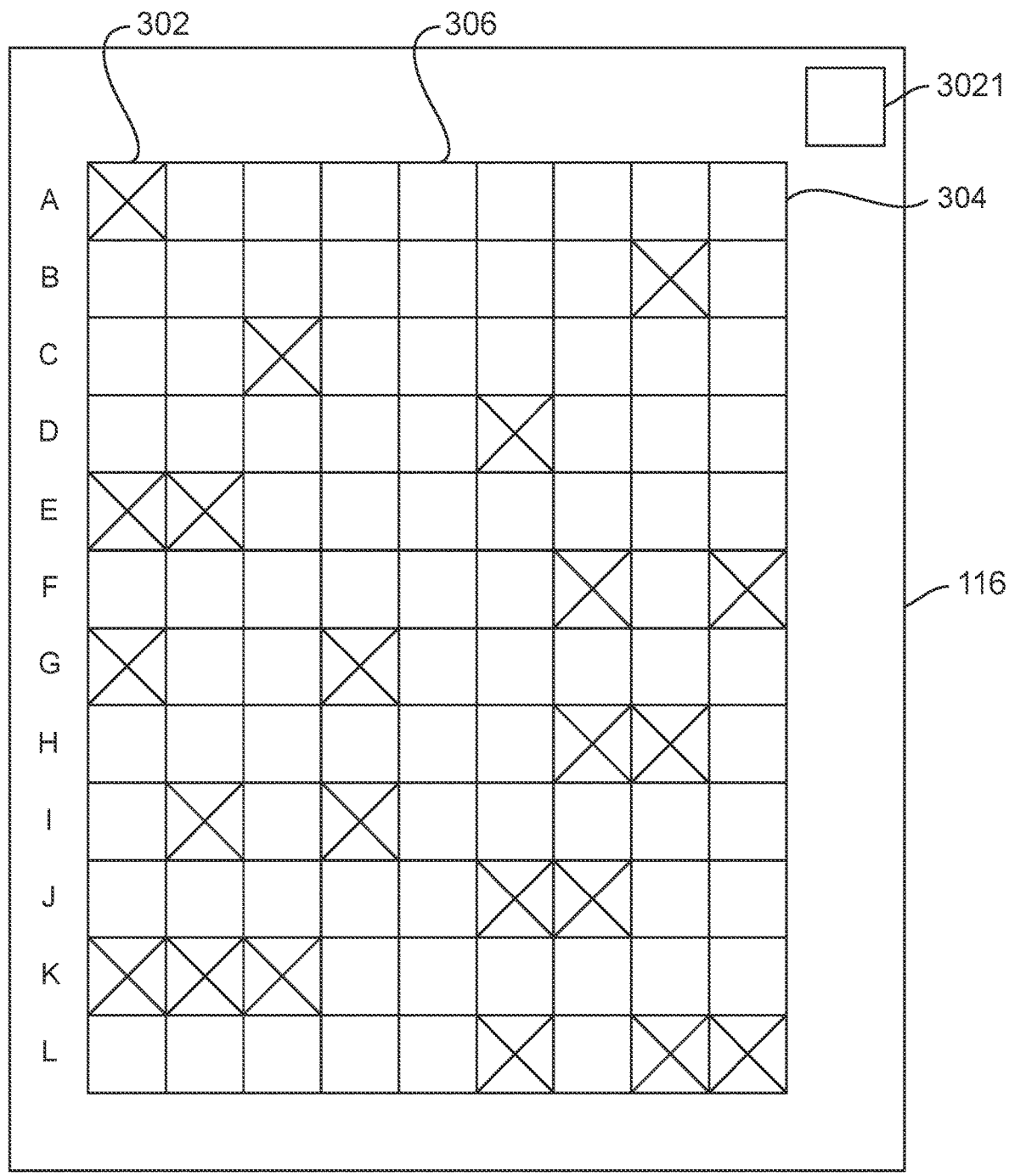
FIG. 4 illustrates a modified test color sheet according to the disclosed embodiments.

FIG. 4 depicts a modified test color sheet 116 according to the disclosed embodiments. In some embodiments, it may be desired to balance the positions of control color patches 302. FIG. 3 shows control color patches 302 positioned on the left side of test color sheet 116. FIG. 4, in contrast, shows control color patches 302 on both sides of test color sheet. Center-most color patch 306 in each color strip still does not have a control color patch 302.

The disclosed embodiments may implement a balancing process to evenly distribute control color patches 302 without giving up the unique pattern to identify the color strip and the scanning direction. Test color sheet 116 of FIG. 4 balances the distribution of control color patches 302 by reversing every other color strip so that control color patches are located on the right side of the test color sheet. This feature may help balance the use of different color patches 304 throughout test color sheet 116. Depending on the media, it may not be desirable to have segments of the media be devoid of any colorant or measurable patches. Calibration should take into account the color response throughout the whole sheet, not just certain parts.

Color strips A-L can be reordered so that the color strips with more control color patches 302 are more evenly distributed on test color sheet 116. The different patterns still may uniquely identify the color strips, using the scanned strings disclosed above. The disclosed embodiments may reorient the scanned strings to have all control color patches 302 on one side of the string. Then, the color strips may be identified. For example, the disclosed embodiments may scan a color strip having a string of OOOOOOXXX, which is reoriented to XXXOOOOOO to identify color strip K. When compared to the reference pattern for color strip K, the disclosed embodiments determine that the scan direction is right to left. The next color strip may result in a string of OOOOOXOXX, which is reoriented to XXOXOOOOO to identify color strip L. Again, based on the reference color string pattern for color strip L, the disclosed embodiments may determine that the scan direction is from left to right. The measured color patches within each color strip are analyzed accordingly. Thus, the disclosed embodiments allows detection of inadvertent repeated scanning of a color strip.

Figure 5:
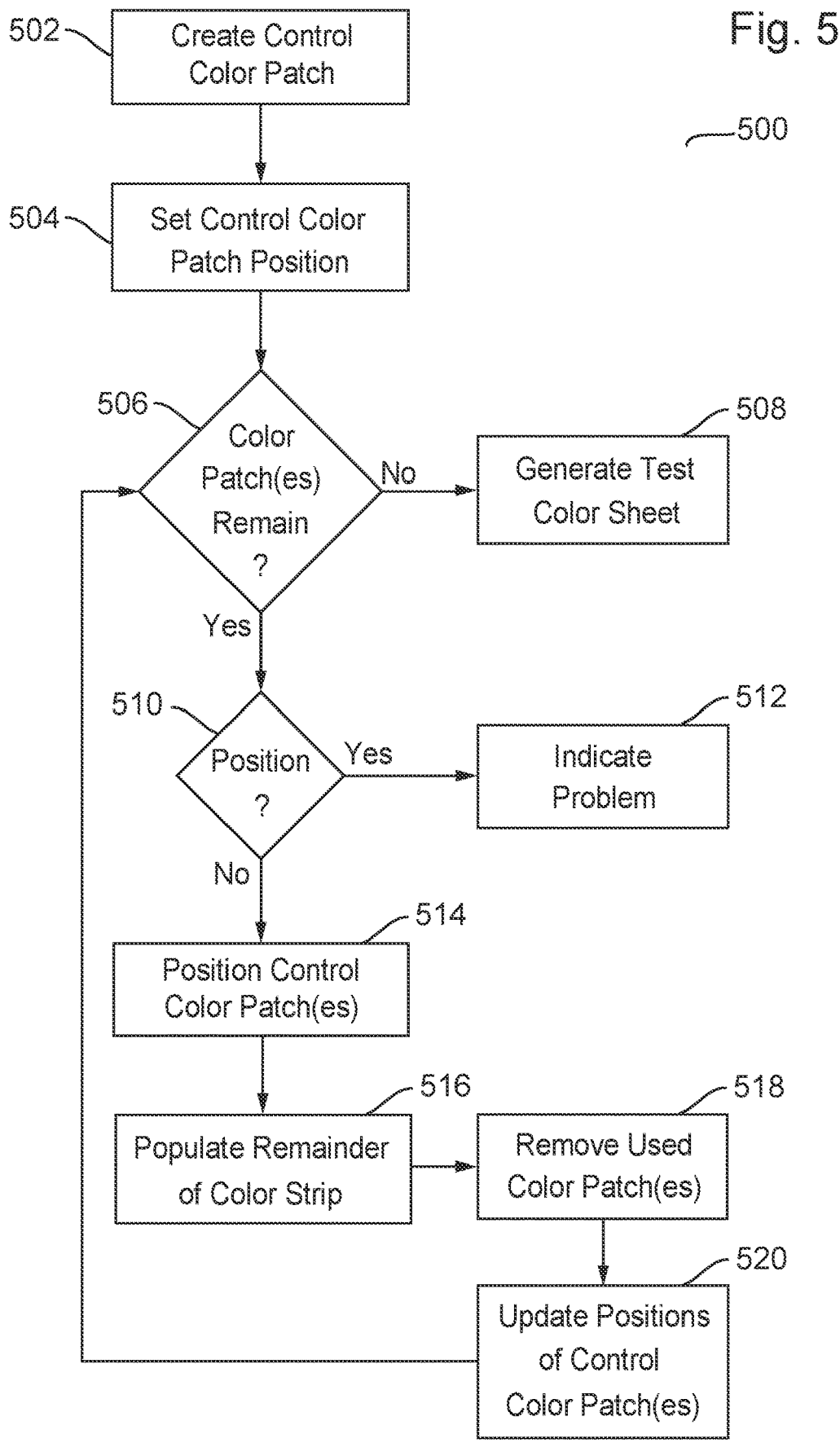
FIG. 5 illustrates a flowchart for generating the test color sheet with control color patches according to the disclosed embodiments.

FIG. 5 illustrates a flowchart 500 for generating test color sheet 116 with control color patches 302 according to the disclosed embodiments. Flowchart 500 may refer to FIGS. 1-4 for illustrative purposes. The embodiments disclosed by flowchart 500, however, are not limited to those disclosed by FIGS. 1-4. The embodiments disclosed by flowchart 500 presume that the left side of test color sheet 116 is being used for color control patch position determinations.

Step 502 executes by creating control color patch 302. Control color patch 302 may be created by determining a color to represent this patch within test color sheet 116. As noted above, white may be a default color for control color patches 302 on white paper as it does not use much ink, if any. Further, reference control color patch 3021 may be generated to be placed on test color sheet 116, preferably in a reference color strip not associated with color strips A-L. Step 504 executes by setting control color patch position to left-most position for the next, or first, color strip. As shown in FIG. 3, color strip A has its control color patch 302 positioned in the left-most position.

Step 506 executes by determining whether any remaining color patches 304 to include in test color sheet 116. In other words, do any further color patches 304 need to be placed on test color sheet 116. If no, then step 508 executes by generating test color sheet 116 with control color patches 302 and color patches 304 positioned therein. Test color sheet 116 is provided to printing device 104 to be printed.

If step 506 is yes, then step 510 executes by determining whether the right-most control color patch in the color strip is beyond the right-most allowed position. In other words, step 510 may determine whether any control color patch 302 is to the right of center-most patch 306. Color strips E-L all have more than one control color patch 302 so this determination prevents those patterns having multiple control color patches from violating the position restrictions for test color sheet 116. If step 510 is yes, then step 512 executes by indicating there is a problem with the current color strip and its control color patch pattern. A warning may be provided to the operator. Generation of test color sheet 116 may be put on hold until the proposed positioning of control color patches 302 is checked.

If step 510 is no, then step 514 executes by positioning one or more control color patches 302 within the respective color strip. One or more control color patches 302 should have a unique pattern for that color strip. Step 516 executes by populating the remainder of the color strip with color patches 304. Color patches 304 may be taken from a group of color patches not yet positioned within test color sheet 116. Step 518 executes by removing the used color patches positioned in the current color strip from the remaining color patches collection. Step 520 executes by updating the positions of control color patches 302 for the next color strip, if needed. This step is disclosed in greater detail by FIG. 6. Flowchart 500 proceeds to step 506 to create the next color strip or generate test color sheet 116.

Figure 6:
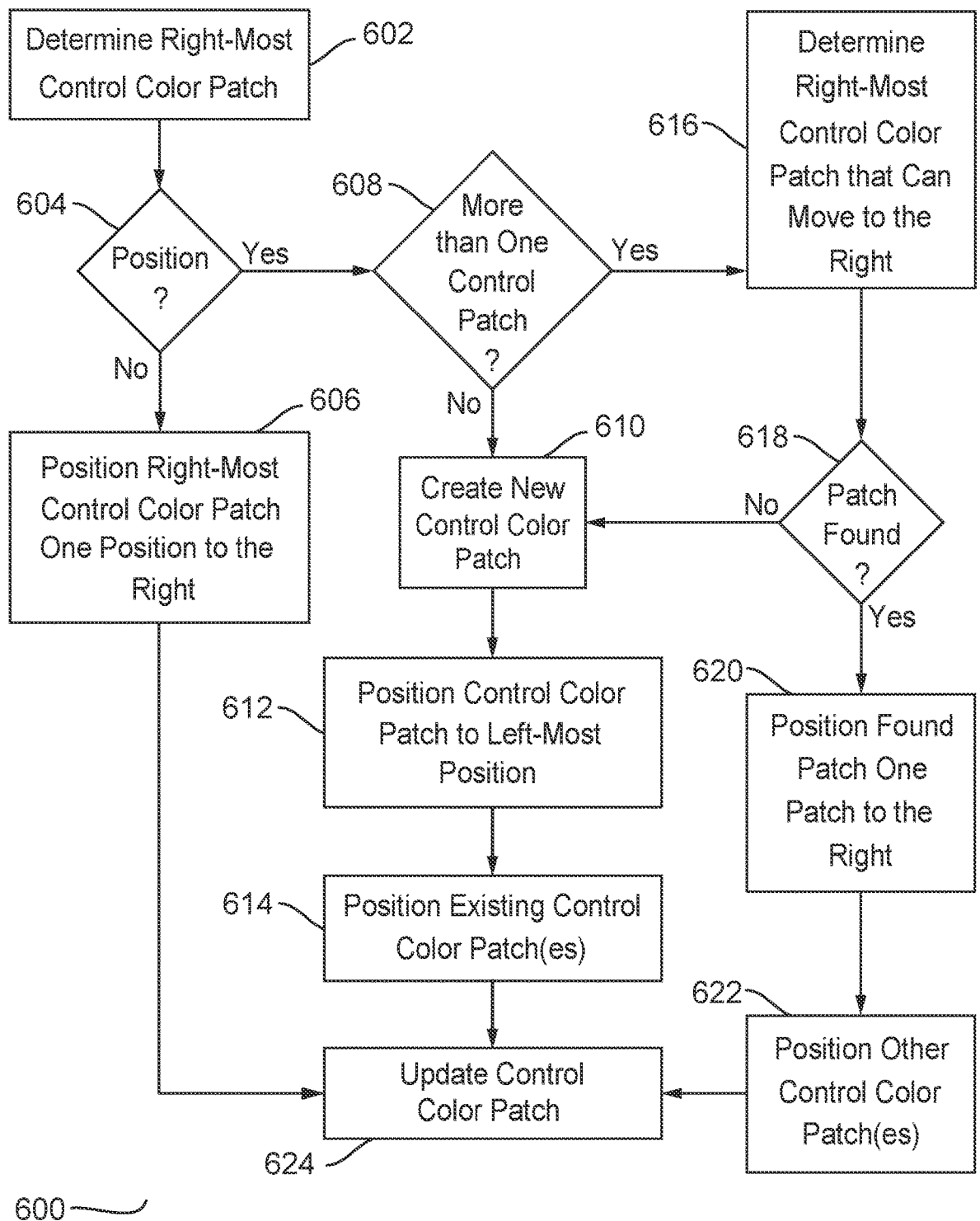
FIG. 6 illustrates a flowchart for updating positions of control color patches within a color strip according to the disclosed embodiments.

FIG. 6 depicts a flowchart 600 for updating positions of control color patches 302 within a color strip according to the disclosed embodiments. Flowchart 600 may refer to FIGS. 1-5 for illustrative purposes. The embodiments disclosed by flowchart 600, however, are not limited to those disclosed by FIGS. 1-5. Specifically, flowchart 600 may relate to step 520 of flowchart 500. Step 520, however, is not limited to the embodiments disclosed by flowchart 600.

Step 602 executes by determining a position for the right-most control color patch 302 within the color strip. Step 604 executes by determining whether the right-most control color patch 302 is at the right-most allowed position. For example, color strip G would have the right-most control color patch 302 in the right-most allowed position to the left of center color patch 306. Thus, step 604 would indicate a yes status for color strip G. Color strip F, however, would have a status of no.

If step 604 is no, then step 606 executes by positioning the right-most control color patch 302 one position to the right within the color strip. For example, color strip E would move its right-most control color patch 302 to the next position to the right, as shown in color strip F. Flowchart 600 proceeds to step 624, disclosed below.

If step 604 is yes, then step 608 executes by determining whether the current color strip includes more than one control color patch 302. For example, color strips A-D do not have more than one control color patch 302 so their statuses would be no. Color strips E-L would have a status of yes.

If step 608 is no, such as the statuses of color strips A-D, then step 610 executes by creating a new control color patch 302 to be positioned within the color strip. New control color patch 302 will have the same color as the other control color patches. Step 612 executes by positioning the new control color patch 302 to the left-most position for the next color strip. Step 614 executes by positioning the existing control color patches to positions adjacent to the newly created control color patch in the left-most position. Color strip E may be an example of the next color strip generated after these steps, wherein color strip D has a single control color patch 302 in the right-most position. Flowchart 600 proceeds to step 624, disclosed below.

If step 608 is yes, such as the statuses of color strips E-L, then step 616 executes by determining the right-most control color patch 302 that can move to the right without violating any positioning restrictions. This control color patch 302 is the right-most control color patch that does not have a control color patch that is adjacent to its right and is not at the right-most allowed position within the color strip. For example, color strips E, F, G, H, I, K, and L include a control color patch 302 that can be moved to the right that is not in the right-most allowed position. Step 618 executes by determining whether such a control color patch can be found within the color strip.

If step 618 is no, then flowchart 600 proceeds to step 610 to generate a control color patch pattern for the next color strip using steps 610-614 disclosed above. If step 618 is yes, then step 620 executes by positioning the found control color patch one position to the right. For example, color strip G moves the control color patch in the left-most position to the next position to the right. Step 622 executes by positioning the other control color patches 302 accordingly. Preferably, step 622 moves all other control color patches 302 previously positioned to the right of the found control color patch so that they are now positioned adjacent and to the right of the found control color patch. Referring back to color strip G, the next color strip H shows the positional relationship provided by step 622.

Step 624 executes by updating the positions of control color patches 302 for the next color strip. Using this process, each color strip has a unique pattern of control color patches 302 that identifies the respective color strip. The updated positions may be stored for the associated color strip for use during measurement operations using test color sheet 116.

FIG. 7 depicts a flowchart 700 for positioning control color patches 302 and color patches 304 within a test color sheet 116 according to the disclosed embodiments. Flowchart 700 may refer to FIGS. 1-6 for illustrative purposes. The embodiments disclosed by flowchart 700, however, are not limited to those disclosed by FIGS. 1-6.

Step 702 executes by determining a plurality of rows of color patches 304 for test color sheet 116. The plurality of rows correspond to color strips, disclosed above and shown as color strips A-L in FIG. 3. Step 704 executes by identifying a control color for a plurality of control color patches 302. The control color does not match a color used in color patches 304. For example, the control color for control color patches 302 may be white for white paper, which is not used as a color for calibration operations.

Step 706 executes by segmenting a portion of the plurality of rows on test color sheet to include the plurality of control color patches 302. Using the above example, the portion of test color sheet may be those patches to the left of center color patch 306 in the color strips. In other embodiments, the portion may be those patches to the right of center color patch 306. If no center color patch exists, then the left half of the patches on test color sheet 116 may be used as the portion.

Step 708 executes by positioning a first set of one or more control color patches 302 according to a first pattern in the portion of a first row of color patches 304. As shown in FIG. 3, each color strip, or row of color patches, has a pattern located in the portion of test color sheet 116 indicated for having control color patches. This pattern may be generated as disclosed above using the positions of control color patches 302. Step 710 executes by positioning a second set of one or more control color patches 302 according to a second pattern in the portion of a second row of color patches. The second pattern differs from the first pattern. Referring to FIG. 3, color strip A has a first set of control color patch 302 positioned in first pattern. Color strips B-L have sets of control color patches 302 positioned in patterns that differ from the first pattern for color strip A.

Step 712 executes by modifying the second row of color patches to position the second pattern of the second set of control color patches 302 outside the portion. Referring to FIG. 4, control color patch 302 is positioned according to the second pattern shown in FIG. 3 on the right side portion of test color sheet 116. Step 714 executes by associating the first row of color patches, or color strip A, with the first pattern for the first set of one or more control color patches 302 and the second row of color patches, or color strip B, with the second pattern for the second set of one or more control color patches 302. This association may be stored at color management server 106 or printing device 104 for reference during measurement operations using test color sheet 116.

FIG. 8 depicts a flowchart 800 for measuring control color patches 302 and color patches 304 of a test color sheet 116 according to the disclosed embodiments. Flowchart 800 may refer to FIGS. 1-7 for illustrative purposes. The embodiments disclosed by flowchart 800, however, are not limited to those disclosed by FIGS. 1-7.

Step 802 executes by measuring a first row of color patches 304, or a color strip, and one or more control color patches 302. Test color sheet 116 is printed out at printing device 104 and its color patches are scanned by color measurement tool 108. Step 804 executes by identifying one or more control color patch 302 within the first row, or color strip. A measured color for one or more control color patch 302 corresponds to a specified control color. As disclosed above, a control color is determined and used for control color patches 302.

Step 806 executes by determining a first pattern for one or more control color patch 302 in the first row, or color strip. For example, color strip A may have a first pattern with control color patch 302 in the left-most patch position. Color strips B-L have different patterns of control color patches 302. Step 808 executes by determining a portion of the first row, or color strip, where the first pattern is positioned. Preferably, the portion is a left-side or right-side portion of the color strip. Step 810 executes by identifying the position of the pattern of control color patches within the first row, or color strip. If the first pattern is in a portion of test color sheet 116 indicated to not include control color patches 302, then the first pattern may be repositioned according to meet the position restriction. For example, referring to FIG. 4, color strip B includes control color patch 302 on the right side of the color strip. The pattern is reoriented to place it on the left side of color strip B.

Step 812 executes by associating the first row with a first stored row of color patches according to the first pattern. In other words, the first pattern of one or more control color patches 302 is used to uniquely identify the corresponding row in the reference color patches for test color sheet 116. Step 814 executes by determining a scanning direction for the first row based on the portion where the first pattern is positioned. As disclosed above, wherein the pattern of control color patches is located may determine the scanning direction, either left to right or right to left. In some embodiments, step 814 may be performed before step 812. Thus, flowchart 800 would just reorder these steps accordingly.

Step 816 executes by determining whether there are more rows, or color strips, to measure within test color sheet 116. If yes, then flowchart 800 proceeds back to step 802 to measure the next row of color patches, or color strip. The disclosed embodiments may measure the second row of color patches 304 and one or more control color patches 302, identify the one or more control color patches within the color strip, and determine a second pattern for one or more control color patches 302 in the second row. The second pattern differs from the first pattern so that the color strips may be uniquely identified during measurement operations.

If step 816 is no, then step 818 executes by finishing measurements of color patches 304 within test color sheet 116. Measurement data 122 may be generated and sent to be processed for calibration operations. It may be sent to color management server 106 or stored at printing device 104. Thus, the disclosed embodiments allow color strips to be measured in any order. The disclosed embodiments also minimize scanning of incorrect color strips by eliminating the need for the operator performing the measurements to identify the color strip being measured. These features improve the process of measuring test color sheets 116.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for positioning color patches within a test color sheet, the method comprising:
    determining a plurality of rows of color patches for the test color sheet;
    placing a reference control color patch having a control color on the test color sheet, wherein the control color is used for a plurality of control color patches within the plurality of rows, wherein the control color does not match a color used in the color patches;
    segmenting a portion in each of the plurality of rows on the test color sheet to include the plurality of control color patches, wherein the plurality of rows correspond to a plurality of patterns of the plurality of control color patches such that each row corresponds to a respective pattern within its respective portion;
    positioning a first set of at least one control color patch that match the reference control color patch according to a first pattern of the plurality of patterns in the respective portion within a first row of color patches of the plurality of rows;
    positioning a second set of at least one control color patch that match the reference control color patch according to a second pattern of the plurality of patterns in the respective portion within a second row of color patches of the plurality of rows, wherein the second pattern differs from the first pattern; and
    associating the first row of color patches with the first pattern for the first set of at least one control color patch and the second row of color patches with the second pattern for the second set of at least one control color patch.

2. The method of claim 1, further comprising positioning a third set of at least one control color patch according to a third pattern in the portion of a third row of color patches of the plurality of rows, wherein the third pattern differs from the first pattern and the second pattern.

3. The method of claim 1, wherein the first set of at least one control patch includes at least two control color patches.

4. The method of claim 1, further comprising modifying the second row of color patches to position the second pattern of the second set outside the portion of the second row.

5. The method of claim 1, wherein the first pattern indicates a scan direction for the first row of color patches.

6. The method of claim 5, wherein the second pattern indicates a scan direction for the second row of color patches.

7. A method for measuring color patches of a test color sheet, the method comprising:
    placing a reference control color patch having a control color on the test color sheet;
    measuring the control color of the reference control color patch;
    measuring a first row of color patches and at least one control color patch;
    identifying the at least one control color patch within the first row, wherein a measured color for the at least one control color patch matches the control color of the reference control color patch;
    determining a first pattern for the at least one control color patch in the first row;
    determining a portion of the first row where the first pattern is positioned;
    determining a scanning direction for the first row based on the portion where the first pattern is positioned; and
    associating the first row with a first stored row of color patches according to the first pattern.

8. The method of claim 7, further comprising identifying a position of the first row within the test color sheet according to the first pattern.

9. The method of claim 7, further comprising:
measuring a second row of color patches and at least one control color patch;
identifying the at least one control color patch within the second row, wherein the measured color for the at least one control color patch matches the control color of the reference control color patch; and
determining a second pattern for the at least one control color patch in the second row that differs from the first pattern for the at least one control color patch in the first row.

10. The method of claim 9, further comprising determining a portion of the second row where the pattern is positioned.

11. The method of claim 10, further comprising determining a scanning direction for the second row based on the portion where the second pattern is positioned.

12. A method for capturing measurement data for calibration of a printing device, the method comprising:
configuring a test color sheet for the calibration, wherein the test color sheet includes a plurality of rows having color patches;
placing a reference control color patch having a control color on the test color sheet;
measuring the control color of the reference control color patch;
selecting a unique pattern for at least one control color patch for each row of the plurality of rows, wherein the unique pattern is not used in another row of the plurality of rows and wherein the at least one control color patch uses the control color of the reference control color patch;
positioning the unique pattern in a portion of each row, wherein the portion is positioned to include the left-most color patch within the respective row or to include the right-most color patch within the respective row;
measuring the plurality of rows having color patches and at least one control color patch, wherein a measured color for the at least one control color patch matches the control color of the reference control color patch;
determining the unique pattern for the at least one control color patch for each row of the plurality of rows;
determining the unique pattern is positioned in the portion for the row;
associating each row with a stored row of color patches according to its unique pattern; and
determining a scanning direction for each row based on the portion where the unique pattern is positioned.

13. The method of claim 12, further comprising compiling measured data for each row of the plurality of rows according to the associated unique pattern.

14. The method of claim 12, further comprising alternating the portion for each row to include the left-most color patch within the respective row then to include the right-most color patch within the respective row.

15. The method of claim 12, further comprising generating a plurality of unique patterns.

16. The method of claim 12, further comprising positioning each of the at least one control color patch in the unique pattern based on the portion for the row.

17. The method of claim 12, wherein measuring the plurality of rows includes measuring the color patches and the at least one control color patch with a color measurement tool.

18. The method of claim 12, wherein the unique patterns for the at least one control color patch are positioned to include the left-most color patch within the respective row or to include the right-most color patch within the respective row.

* * * * *